United States Patent [19]

Gutjahr

[11] Patent Number: 4,770,623
[45] Date of Patent: Sep. 13, 1988

[54] PLASTIFICATION CYLINDER FOR INJECTION MOLDING MACHINES

[75] Inventor: Lothar Gutjahr, Malterdingen, Fed. Rep. of Germany

[73] Assignee: Klöckner Ferromatik Desma GmbH, Malterdingen, Fed. Rep. of Germany

[21] Appl. No.: 11,326

[22] Filed: Feb. 5, 1987

[30] Foreign Application Priority Data

Feb. 5, 1986 [DE] Fed. Rep. of Germany ....... 3603500

[51] Int. Cl.$^4$ .......................................... B29C 45/74
[52] U.S. Cl. ................................... 425/207; 219/301; 219/424; 219/425; 366/146; 366/266; 425/550
[58] Field of Search ............... 366/144, 145, 146, 149, 366/266; 425/378 R, 144, 547, 548, 550, 207, 208, DIG. 43; 219/301, 421, 330, 331, 276, 350, 352, 355, 369, 385, 400, 406, 407, 420, 424, 390, 423, 425

[56] References Cited

U.S. PATENT DOCUMENTS

| Re. 23,839 | 6/1954 | Magerkurth et al. | 425/207 |
| 3,055,074 | 9/1962 | Garvey | 425/378 R |
| 3,991,153 | 11/1976 | Klausner et al. | 425/208 |
| 4,038,519 | 7/1977 | Foucras | 219/301 |
| 4,118,163 | 10/1978 | Lee | 425/208 |
| 4,235,581 | 11/1980 | Anders | 425/378 R |
| 4,253,011 | 2/1981 | Hinz | 219/421 |
| 4,319,871 | 3/1982 | McAllster | 425/378 R |
| 4,686,354 | 8/1987 | Makin | 219/301 |

FOREIGN PATENT DOCUMENTS 2242224 3/1975 France .

Primary Examiner—Willard Hoag
Attorney, Agent, or Firm—Watson, Cole, Grindle & Watson

[57] ABSTRACT

A plastification cylinder of an injection molding machine includes an outside cylinder and an inside cylinder, the inside cylinder including heating elements and temperature sensors therearound and defining a screw antechamber at one end thereof, the outside cylinder being shaped so that the end thereof which surrounds the end of the inside cylinder that defines the screw antechamber is in a pressure fit contact with the inside cylinder while the other end of the outside cylinder is spaced away from the corresponding end of the inside cylinder, thereby providing an annular chamber therebetween. Connecting elements extending through the outside cylinder can be used to cause a fluid heating or cooling medium to flow through the annular chamber.

4 Claims, 2 Drawing Sheets

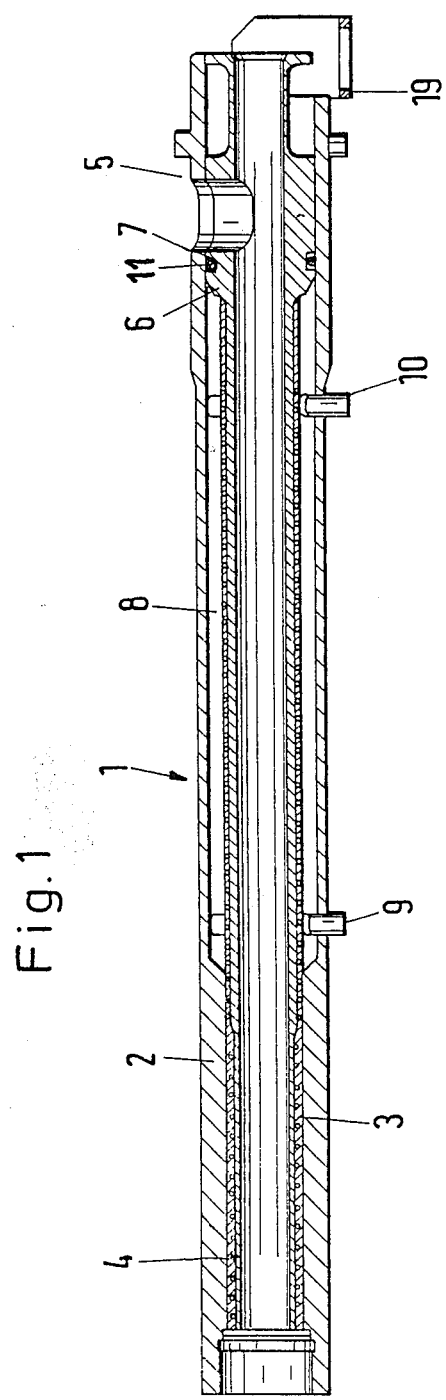

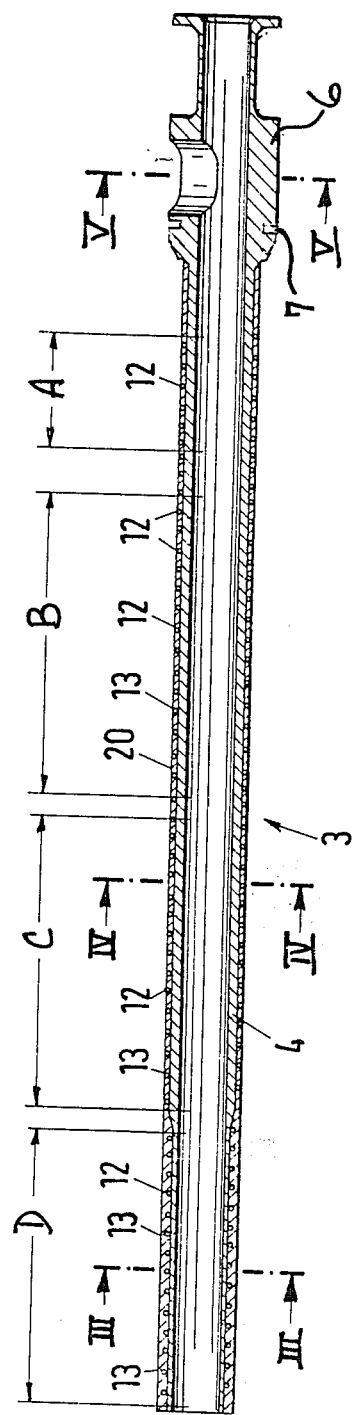

PLASTIFICATION CYLINDER FOR INJECTION MOLDING MACHINES

BACKGROUND OF THE INVENTION

The present invention relates to a plastification cylinder for the processing of plastifiable material in injection molding machines, the plastification cylinder being divided into heating and/or cooling zones and including heating elements and temperature sensors which are located in mutually independent zones.

Plastifiable material in the sense of the invention includes thermoplastic molding materials and interlaced molding materials, such as duroplasts and elastomers.

Due to the demand for injection molded items of high quality, especially items having stable properties and dimensions, considerable demands are made on the control elements of such machines. An important problem which has not previously been solved is that the injection molding machines, after the start-up phase, do not run in a stable manner in the sense that only essentially negligible temperature variations will occur in the plastification and injection unit, i.e., in the plastified material. Temperature variations in the plastified material result in changes in viscosity. Such viscosity changes can to some extent be compensated for, but have produced considerable difficulties, which have not yet been solved to a sufficient extent.

The temperature variations, which are caused mainly by friction in the material to be plastified, can have the effect that the finished injection molded articles have different material properties. This problem has so far also not been satisfactorily solved. This is due to the constructions of known plastification and injection cylinders. Due to the very high pressures occurring during injection, it is necessary to correspondingly dimension the wall thickness of these plastification and injection cylinders. Such plastification and injection cylinders have heating bands and thermosensors on the outside coating, which are generally arranged so as to be divided into three zones. The full heating output is only needed during the start-up phase.

These known plastification and injection cylinders have, however, a high heat capacity, so that the temperatures reported by the heat sensors on the outside wall do not even approach agreement with the temperature of the plastified material therein. Added to this is the time lapse of the phases between the temperature changes occurring in the plastified material and the temperature changes indicated by the temperature sensors.

Adding to the problem is the fact that the temperature of the plastified synthetic material is also subject to temperature variations. During the plastification, the temperature rises because of friction and then falls somewhat during the injection of the plastified synthetic material. To this extent it is understandable that considerable time phase shifts between the temperatures registered on the outside walls of the plastification cylinders and the actual temperatures in the plastified material occur, so that, based on the large time constant, complicated algorithms had to be utilized in the temperature regulation, in order to get a hold on this type of regulation. However, problems arise, particularly then when new materials, critically dependent on temperature control, are being processed.

Thus, e.g., in the production of CD disks made of polycarbonates, it is necessary to execute the plastification and homogenization of the material in the shortest possible time near the upper limit of the processing temperature.

Based on the so far appearing deviation from the rule, it has been necessary to provide for a high safety distance to the disintegration temperature and to accept possible qualitative disadvantages.

The present object of the invention is to provide a heatable plastification cylinder which permits the processing of synthetic material as near as possible to the upper processing temperature and which produces a sufficiently exact temperature behavior.

SUMMARY OF THE INVENTION

According to the invention the plastification cylinder has an outside cylinder and an inside cylinder, and both cylinders are firmly joined in the area of the screw antechamber, the inside cylinder having the heating elements and the temperature sensors and the end section of the outside cylinder which is remote from the screw antechamber has a clearance fit with respect to the inside cylinder.

As noted, the inside cylinder and the outside cylinder are firmly joined only in the area in which there are high pressures, while, because of the clearance fit according to the invention in the area of the end section remote from the screw antechamber, the inside cylinder can easily follow longitudinal expansions based on temperature variations, to which the outside cylinder is not significantly exposed because of its considerably higher heat capacity.

In another embodiment of the invention an annular chamber is provided beyond of the screw antechamber between the inside cylinder and the outside cylinder. This allows the heat transfer between the inside cylinder and the outside cylinder to be considerably reduced, so that the inside cylinder can without problem follow the momentary temperature variations of the plastified or to be plastified material.

In another embodiment of the invention the annular chamber has connections for the inflow of a flow medium. This medium can be, on the one hand, a cooling medium, such as water, but it is also possible to use a heating medium which, before start-up of the injection molding machine, heats the plastification cylinder to the operational temperature.

In order to achieve an intimate contact between the heating elements and temperature sensors and the inside cylinder, in another embodiment of the invention, the heating elements and temperature sensors arranged along the outside wall of the inside cylinder are embedded in a metal layer sprayed onto the inside cylinder.

In still another embodiment of the invention, the inside cylinder has at least one axially running groove for the contact leads of the heating elements and/or temperature sensors, so that the contact leads for the individual zones are led, in part, under the heating elements and temperature sensors of the other zones.

In still another embodiment of the invention, the grooves end in the area of the end section remote from the screw antechamber of the inside cylinder in a contact area for a plug contact so that the heating elements and temperature sensors can easily be attached.

In yet another embodiment of the invention the outside cylinder is shrunk onto the inside cylinder in such a manner that in the area of the screw antechamber there is an intimate contact between the two cylinders and that the varying longitudinal changes of the two cylinders to each other is within the range of the clearance fit.

According to a preferred embodiment, a portion of the outside cylinder is shrunk, e.g., pressure fit, against the inside cylinder where the antechamber therein is located with a force which generally corresponds to the maximum counterpressure to be exerted by the plastified material in the inside cylinder. In this way, the heating elements and temperature sensors in the area of the screw antechamber, will not be subjected to inadmissibly high pressures during the operation of the injection molding machine.

In another embodiment of the invention, the contact wires of the heating elements and temperature sensors in the area of the screw antechamber are led in axially running grooves under the heating elements and temperature sensors of the other zones, a measure which is only possible because today heating elements and temperature sensors with extremely high longevity, even under extreme operating conditions, are available.

In yet another embodiment of the invention, a seal is arranged in the area of the clearance fit between the outside cylinder and the inside cylinder, so that a liquid medium, such as water, heat transfer oil or similar fluid, can be used as a flowing medium.

The invention will be better understood by reference to the accompanying drawings and the following discussion.

BRIEF DESCRIPTION OF THE DRAWINGS

FIG. 1 shows a longitudinal section through a plastification cylinder according to the present invention, FIG. 2 shows a longitudinal section through the inside cylinder of the plastification cylinder shown in FIG. 1, FIG. 3 shows a cross section through the inside cylinder as seen along line III—III in FIG. 2, FIG. 4 shows a cross section through the inside cylinder as seen along line IV—IV in FIG. 2, FIG. 5 shows a cross section through the inside cylinder as seen along line V—V in FIG. 2.

DETAILED DESCRIPTION OF THE PREFERRED EMBODIMENT

FIG. 1 shows the plastification cylinder, designated by reference numeral 1, in a longitudinal section. It is seen to include an outside cylinder 2 and an inside cylinder 3. The inside cylinder and the outside cylinder are firmly joined in the area of the screw antechamber 4 by shrinking, while the screw section 5, remote from the screw antechamber, is constructed to have a clearance fit between the inside cylinder and the outside cylinder. The end section 6 of the inside cylinder, remote from the screw antechamber, is led in a sliding manner by the outside cylinder, also has an annular groove 7, into which a string ring 11 is set as seal.

The area between the screw antechamber and the clearance fit between the outside cylinder and the inside cylinder is made as annular chamber 8, as is attained in the simplest manner, according to FIG. 1, by having the inside diameter of the outside cylinder larger than in the area of the screw antechamber. The outside cylinder has connection elements 9 and 10 for the feed or discharge of a fluid medium for which, if it is a liquid medium, the seal 11 is needed.

The inside cylinder, shown simplified in FIG. 1, is shown in more detail in FIG. 2. Its wall 4 is divided into four zones A, B, C and D, in which the heating elements, generally designated by 12, as well as the thermo-elements 13, are arranged.

The heating elements 12 are known spiral heating bands, the connecting leads of which run in an axial direction. For this purpose grooves 15, 16, 17 and 18 (see FIG. 5), running in an axial direction, are arranged in the wall of the inside cylinder, containing these connecting leads of the heating elements and the connecting leads of the temperature sensors in the respective zones, whereby the connecting leads of the heating elements and the temperature sensors of the respective zones extend in the grooves under the adjacent heating zones and connected to a plug part, designated schematically by 19 in FIG. 1.

The heating elements and thermo sensors are embedded in a sprayed on metal layer, in this case a sprayed on nickel layer 20, which is carefully smoothed after application. The grooves 15, 16, 17 and 18 are concurrently filled, thus enabling the seal 11 to be effective.

Subsequently, the heating cylinder with its embedded heating elements and temperature sensors is joined to the outside cylinder by shrinking in the area of the screw antechamber. The procedure for this is that the outside cylinder is shrunk on upright with such tension as corresponds about to the maximum counterpressure built up by the plastified material.

I claimed:

1. In an injection molding machine which includes a plastification cylinder for plastifying material to be injected into an injection mold, the improvement wherein said plastification cylinder comprises an elongated inside member which has a first end and a second end and which provides an axial flow channel therein for material to flow along said axial flow channel and out of said first end into an injection mold; an elongated outside member which surrounds said elongated inside member and which has a first end in fixed contact with the first end of said inside member and a second end in register with the second end of said inside member, the second ends of said inside and outside members being axially movable with respect to one another; and a plug member at the second ends of said inside and outside members; said elongated inside member comprising an inner portion which provides at least one axial channel that extends to the second end of said inside member and an outer portion which is made of metal and which includes a plurality of heating elements and temperature sensors embedded therein, said heating elements and temperature sensors having lead wires which extend along at least one of said axial channels to connect to said plug member, and said outside member having a larger inside diameter than the outside diameter of said inside member along a portion of the axial length of said inside member between the first and second ends thereof to provide an annular fluid temperature-control chamber therebetween.

2. The injection molding machine according to claim 1, wherein said plastification cylinder including two axially-spaced apart connection elements which extend through said outside member and communicate with said annular fluid temperature-control chamber.

3. The injection molding machine according to claim 1, wherein said plurality of heating elements comprise separate spiral heating coils which are sequentially located along the length of said inside member, thus dividing the length of said plastification cylinder into separate temperature-control portions.

4. The injection molding machine according to claim 1, including a seal means between the inside and outside members near their corresponding second ends.

* * * * *